United States Patent
Lopez Venegas et al.

(10) Patent No.: US 10,395,220 B2
(45) Date of Patent: Aug. 27, 2019

(54) AUTO-GENERATION OF ACTIONS OF A COLLABORATIVE MEETING

(71) Applicant: International Business Machines Corporation, Armonk, NY (US)

(72) Inventors: Adalberto Lopez Venegas, Tepic (MX); Alina Denise Marin Rodriguez, Tepic (MX); Agueda Martinez Hernandez Magro, Zapopan (MX); Orlando Ezequiel Rincón Ferrera, Tiaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 15/133,374

(22) Filed: Apr. 20, 2016

(65) Prior Publication Data
US 2017/0310716 A1 Oct. 26, 2017

(51) Int. Cl.
*G06F 15/16* (2006.01)
*G06Q 10/10* (2012.01)
*H04L 12/18* (2006.01)

(52) U.S. Cl.
CPC ..... *G06Q 10/1093* (2013.01); *H04L 12/1818* (2013.01); *H04L 12/1822* (2013.01)

(58) Field of Classification Search
CPC . H04L 65/1083; H04L 51/046; H04L 65/403; G06Q 10/1093
See application file for complete search history.

(56) References Cited

U.S. PATENT DOCUMENTS

| 4,807,155 A | * | 2/1989 | Cree | G06Q 10/109 345/1.1 |
| 7,124,164 B1 | * | 10/2006 | Chemtob | G06Q 10/10 709/204 |

(Continued)

FOREIGN PATENT DOCUMENTS

EP 2680256 A1 1/2014

OTHER PUBLICATIONS

"System to process of voice calls and voicemails then displaying important details back to the user as actionable items after the call.", An IP.com Prior Art Database Technical Disclosure, IP.com No. IPCOM000211510D, IP.com Electronic Publication Date: Oct. 7, 2011, 2 pages.

(Continued)

*Primary Examiner* — Moustafa M Meky
(74) *Attorney, Agent, or Firm* — Daniel R. Simek (57) ABSTRACT

A method for identifying and initiating actions of a meeting. The method includes a computer processor monitoring a meeting where monitoring the meeting includes receiving input from at least a first computing device. The method further includes identifying a plurality of metadata triggers associated with the received input of meeting. The method further includes identifying an occurrence of a first metadata trigger of the plurality of metadata triggers associated with the received input of the meeting. The method further includes analyzing a first portion of the received input of the meeting that includes an occurrence of the first metadata trigger and identifying a first action associated with the first metadata trigger. The method further includes determining a response criterion of the first metadata trigger. The method further includes responding to a determination that the first metadata trigger includes a response criterion indicating immediate action by initiating the first action.

17 Claims, 4 Drawing Sheets

(56) References Cited

U.S. PATENT DOCUMENTS

| | | | | |
|---|---|---|---|---|
| 7,299,405 | B1* | 11/2007 | Lee | G06F 17/30038 348/E7.079 |
| 7,886,001 | B2* | 2/2011 | Asthana | G06Q 10/10 709/204 |
| 8,254,535 | B1 | 8/2012 | Madhavapeddi et al. | |
| 8,326,643 | B1 | 12/2012 | Eshkenazi et al. | |
| 8,554,599 | B2 | 10/2013 | Ghosh et al. | |
| 9,009,592 | B2 | 4/2015 | Friend et al. | |
| 9,195,971 | B2* | 11/2015 | McConnell | G06Q 10/1093 |
| 2009/0204465 | A1* | 8/2009 | Pradhan | G06Q 10/06 705/7.17 |
| 2011/0196784 | A1* | 8/2011 | Newman | G06Q 10/109 705/39 |
| 2012/0069131 | A1* | 3/2012 | Abelow | G06Q 10/067 348/14.01 |
| 2012/0110475 | A1* | 5/2012 | Han | H04L 12/1818 715/753 |
| 2012/0150577 | A1* | 6/2012 | Berg | G06Q 10/1095 705/7.12 |
| 2012/0203551 | A1* | 8/2012 | Lakshmanan | G06Q 10/109 704/235 |
| 2013/0216206 | A1* | 8/2013 | Dubin | H04N 9/87 386/282 |
| 2013/0339875 | A1* | 12/2013 | Sahai | H04L 12/1827 715/753 |
| 2014/0219434 | A1 | 8/2014 | Youel et al. | |
| 2015/0201077 | A1 | 7/2015 | Konig et al. | |
| 2015/0249742 | A1* | 9/2015 | Li | H04M 3/42348 455/414.1 |
| 2016/0036875 | A1* | 2/2016 | High | H04L 65/4038 709/204 |
| 2016/0102879 | A1* | 4/2016 | Guest | F24F 11/006 700/276 |
| 2016/0189164 | A1* | 6/2016 | Tolksdorf | G06Q 30/016 705/304 |
| 2016/0191712 | A1* | 6/2016 | Bouzid | H04M 3/5232 379/265.12 |
| 2016/0275433 | A1* | 9/2016 | Gil | G06Q 10/06395 |
| 2016/0277242 | A1* | 9/2016 | Sallam | H04L 41/0816 |
| 2016/0283586 | A1* | 9/2016 | Thapliyal | G06Q 10/10 |
| 2018/0131904 | A1* | 5/2018 | Segal | H04N 5/262 |
| 2018/0157321 | A1* | 6/2018 | Liu | G06F 3/013 |
| 2018/0196697 | A1* | 7/2018 | Standefer | G06F 9/50 |

OTHER PUBLICATIONS

"Method to create and manage iCalendar events coming from a phone call", An IP.com Prior Art Database Technical Disclosure, IP.com No. IPCOM000212039D, IP.com Electronic Publication Date: Oct. 26, 2011, 3 pages.

"iOS—Siri—Apple", printed Feb. 4, 2016, 1 page, http://www.apple.com/ios/siri/.

"Attention spans", Consumer Insights, Microsoft Canada, Spring 2015, printed Apr. 14, 2016, 52 pages.

* cited by examiner

AUTO-GENERATION OF ACTIONS OF A COLLABORATIVE MEETING

BACKGROUND OF THE INVENTION

The present invention relates generally to the digital monitoring of meetings, and more particularly to generating actions based on communications with meetings.

Collaborative meetings are used to: establish communications among users at various levels within an organization, share information, establish goals, and distribute assignments. Businesses can utilize electronic meetings, such as teleconferences to communicate directly with multiple individuals, such as members of a business, suppliers, and representatives of a client dispersed across various geographical locations without incurring the time, the expense, and the disruption associated with travel for in-person interactions. One common meeting method is a teleconference utilizing audio communications over telecommunication systems. Advances in technology enable digital audio communication, such as Voice over Internet protocol (VoIP). VoIP is not limited to audio communication via a handset, VoIP can support audio obtained, for example from a microphone of a computer. VoIP solutions can also provide users with faxes, voice mail, e-mail, and Web conferences (e.g., an example of a collaboration system).

Collaboration systems combine the use of video, audio, and on-screen drawing capabilities using various: desktop computing devices, mobile devices (e.g., laptop computers, smartphone, smart glasses and other wearable devices, etc.), and shared devices, such as digital projectors and digital whiteboards to communicate over networks, enabling multi-party conferencing in real-time, independent of location. With the advent of Cloud computing systems and Cloud computing services, digital meetings (e.g., teleconferencing) provide a more secure mobile collaboration system where users may exchange data, files, images, videos, etc. In some instances, collaboration software can allow participants in different locations to interact with the data, files, images, and videos (e.g., project management, online proofing, etc.). Collaborative meetings are not limited to a business environment. For example, education, medicine, government, and non-profit organizations also benefit from collaborative meetings.

SUMMARY

According to aspects of the present invention, there is a method, computer program product, and/or system for identifying and initiating actions of a meeting. The method includes one or more computer processors monitoring a meeting, where monitoring the meeting includes receiving input from at least a first computing device. The method further includes identifying a plurality of metadata triggers associated with the received input of the meeting. The method further includes identifying an occurrence of a first metadata trigger of the plurality of metadata triggers associated with the received input of the meeting. The method further includes analyzing a first portion of the received input of the meeting that includes an occurrence of the first metadata trigger, where analyzing the first portion of the received input includes identifying a first action. The method further includes determining a response criterion of the first metadata trigger. The method further includes responding to a determination that the first metadata trigger includes a response criterion indicating immediate action by initiating the first action.

DETAILED DESCRIPTION

Embodiments of the present invention recognize that meetings, whether attended in-person or attended remotely, are utilized by various businesses and organizations to share information, establish goals, and distribute assignments. However, embodiments of the present invention also recognize that attendees (i.e., participants) of a meeting may need to multitask during the meeting. Multitasking during a meeting includes: following dialogs (e.g., discussions); taking personal notes; obtaining reference material; and recording information, such as team assignments, assignment prioritizes, and problem criticalities. The multitasking lowers the effectiveness of the meeting (e.g., repeated questions), increases the probability of errors during note taking, and the possibility of follow-up items not being addressed in the meeting. According to a study by the National Center for Biotechnology Information, the attention span of a person multitasking is (can be as low as) eight seconds. Embodiments of the present invention recognize that various technologies exist that can: record a meeting, either personally or for the meeting attendees; transcribe the meeting into one or more text documents; and to one or more create "to-do" lists, herein identified as tasks, in-situ or based on a recording and/or a transcript of the meeting.

Embodiments of the present invention may be utilized in a plurality of groups and/or individuals, such as businesses, researchers, government agencies, medical professionals, hospitals, students, educators, and the like. Embodiments of the present invention can be utilized in various environments. In an example embodiment, a single computing device implementation may include: a room with in-person meeting attendees, and a digital whiteboard, a microphone, and a digital video camera all connected to a personal computer. In another example embodiment, responding to a natural disaster is illustrative of a diverse, highly-distributed collaborative environment that may include many different types of electronic and computing devices, locations, and data. Other embodiments of the present invention may link two or more separate meetings. In one example, each meeting may be representative of a team, such as electricians, architects, suppliers, etc. that generates internal tasks and timelines; and the teams may coordinate via a mediator (e.g., a project manager) presenting at a client review. In another example, with respect to scrum methodology, embodiments of the present invention can improve automation of: task identification, assignment of tasks, assignment of resources, monitoring timelines, and linking teams.

Embodiments of the present invention utilize metadata triggers to identify keywords associated with events within a meeting that can be associated with one or more actions, which generate a response. Metadata triggers and associated actions can be defined by moderators and/or participants. Embodiments of the present inventions can identify occurrences of metadata triggers during a meeting via: speech recognition, text recognition, and/or image recognition. Embodiments of the present invention identify actions by parsing and analyzing meeting data (e.g., speech, text, images, and video) in relation to an occurrence of a metadata trigger. Some embodiments of the present invention utilize various analytic and/or cognitive capabilities, such as natural language processing (NLP) to identify one or more actions associated with a metadata trigger based on utilizing a thesaurus function that can identify a metadata trigger based on a synonym of a predefined metadata trigger. Such an embodiment of the present invention enables more flexibility for a collaborative meeting that utilized multi-lingual capabilities (e.g., a translation program) for attendees with a primary language different from the language of other participants of the meeting and/or the creator of one or more metadata triggers.

Embodiments of the present invention can include a response criterion that affect actions associated with an occurrence of metadata triggers by: initiating an immediate action (i.e., task), creating a queue of delayed actions (e.g., waiting for a response on an attendee, waiting for another trigger, etc.) within the meeting, and generating a queue of tasks that occur after the meeting (e.g., post-meeting actions). Some metadata triggers include a response criterion utilized for the actions associated with the metadata trigger. Other metadata triggers include response criterion associated with each action of a metadata trigger. Embodiments of the present invention enable metadata triggers that are associated with: the meeting, one or more groups within the meeting, individuals (e.g., meeting participants or not), and/or other resources related to a task. Resources assigned and/or allocated by embodiments of the present invention can include, but are not limited to: individuals, financial resources, inventory, computer hardware, computing time on specialized systems, and physical items, such as materials and laboratory/test equipment.

Some embodiments of the present invention may utilize cognitive analysis, contextual analysis, analytics, and other databases to determine the additional triggers that are associated with a meeting attendee (e.g., a user). Example embodiments of the present invention may access a company database to determine the names of peers and reporting structure of a meeting attendee and include the determined names as additional triggers that can be detected during a meeting and/or are informed (e.g., e-mailed) a copy of one or more tasks assigned to a team member, peer, manager, etc. Other embodiments of the present invention may utilize various analytical and/or cognitive software programs including gesture recognition software to determine additional information and context related to "sentiment" associated with an action, a task, or a response generated by a metadata trigger. Sentiment may be used to prioritize tasks, such as low, medium, high; or a task may be flagged with a sentiment.

An alternative embodiment of the present invention may execute off line and utilize speech recognition, semantic conversion, cognitive analysis, contextual analysis, and analytics software that analyzes information from a recorded meeting or information source (e.g., an on-demand lectures, a recording from a convention, a digital transcript) to identify metadata triggers and associated actions (e.g., tasks). In other embodiments of the present invention, a recording of a meeting (e.g., presentation, proceedings, etc.) and of corresponding tasks, actions, and/or assignments are saved to a meeting database (not shown) for future access.

The descriptions of the various scenarios, instances, and examples related to the present invention have been presented for purposes of illustration but are not intended to be exhaustive or limited to the embodiments disclosed.

Figure 1:
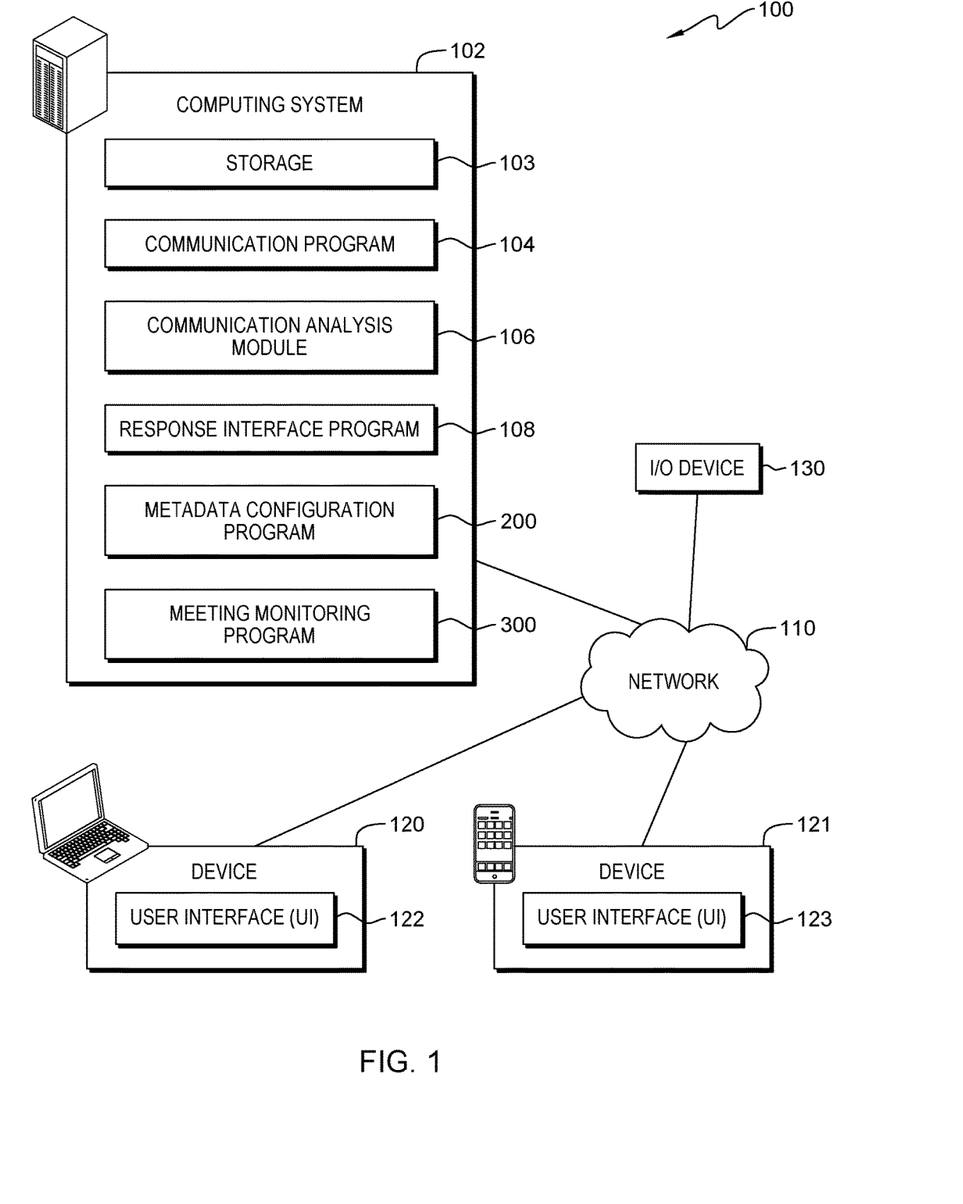
FIG. 1 illustrates a networked computing environment, in accordance with an embodiment of the present invention.

The present invention will now be described in detail with reference to the figures. FIG. 1 is a functional block diagram illustrating networked computing environment 100 in an embodiment, in accordance with the present invention. An embodiment of networked computing environment 100 may include: computing system 102, device 120, device 121, and I/O device 130 all interconnected over network 110. Many modifications to the depicted environment may be made by those skilled in the art without departing from the scope of the invention as recited by the claims.

Computing system 102, device 120, and device 121 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, computing system 102, device 120, and device 121 represent computer systems utilizing clustered computers and components (e.g., database server computers, application server computers, etc.) that act as a single pool of seamless resources when accessed through network 110, as is common in data centers and with cloud-computing applications. In general, computing system 102, device 120, and device 121 are representative of any programmable electronic device or combination of programmable electronic devices capable of executing machine readable program instructions and communicating with users of computing system 102, device 120, and device 121, via network 110. Computing system 102, device 120, and device 121 may include components, as depicted and described in further detail with respect to FIG. 4, in accordance with embodiments of the present invention.

Computing system 102 includes: storage 103, communication program 104, communication analysis module 106, response interface program 108, metadata configuration program 200, meeting monitoring program 300. Computing system 102 also includes various programs and databases, such as a website interface, presentation software, project planning software, Voice over Internet protocol (VoIP) software, conferencing software, a calendar program, audio/video playback software, etc. (not shown) within storage 103. In various embodiments, computing system 102 can access one or more programs, functions, and/or software services from another computing system (not shown) via network 110. In an example, computing system 102 accesses, via network 110, a cloud service provider that provides one or more communication services, such a video conferencing, and other software applications, such as social perception analysis (e.g., gesture recognition, face perception, voice analysis, emotion identification), analytics, and cognitive programs as a Software as a Service (SaaS) offering.

In one embodiment, storage 103 includes user information, user profiles, user preferences, metadata triggers, predefined responses, conference system setups, controls (e.g., phone numbers, access codes, hot-key combinations, etc.), and other information utilized by metadata configuration program 200. Storage 103 may also include user/meeting preferences utilized by meeting monitoring program 300, such as a frequency (e.g., a period of time) of looping utilized by an instance of meeting monitoring program 300, for example, to identify changes of participants of a meeting. In a scenario, storage 103 includes meeting (e.g., moderator) preferences that may dictate which capabilities of communication analysis module 106 are utilized for each meeting. In an example, a moderator of a meeting may dictate that communication analysis module 106 accesses a multi-lingual translation program in response to meeting monitoring program 300 identifying, based on user profiles, one or more participants that utilize different languages.

In another embodiment, storage 103 includes a database that stores information (e.g., metadata triggers, one or more actions, logical element dictates, etc.), which meeting monitoring program 300 communicates to communication analysis module 106 as a basis for monitoring a meeting. In one scenario, storage 103 includes metadata triggers and actions that are generalized and may be utilized within various meetings. In an additional example, storage 103 may include organizational information (e.g., names, departments, reporting structures, calendar entries, etc.) associated with meeting attendees, such as users of device 120 and device 121. In some embodiments, storage 103 includes additional information related to, or included in, the profile of a user that may be utilized to generate contextual and/or logical elements. In an example, the additional information of a user profile may include, but are not limited to: areas of expertise, skills, social-media information, certifications, and contacts that accept delegated tasks.

Communication program 104 includes one or more programs or protocols that enable two or more devices within networked computing environment 100 to establish a connection via network 110 and users of the two devices to attend (e.g., participate in) a meeting. In an example, communication program 104 enables user to participate in: a teleconference, a web meeting, a VoIP meeting, etc.). In some embodiments, a host (e.g., user, moderator) of a meeting utilizes communication program 104 to establish the communication among the devices (e.g., device 120, device 121, etc.) of attendees of a meeting. In other embodiments, communication program 104 links server 102 to a meeting, utilizing network 110, so that the meeting can be monitored by server 102 and meeting monitoring program 300.

Communication analysis module 106 includes a speech recognition program, a speech-to-text conversion program, and an analytics (e.g., NLP) program that analyzes dialog (e.g., verbal, text-based, etc.) of a meeting communicated by network 110. Communication analysis module 106 analyzes the dialog of a meeting to identify occurrences of metadata triggers that occur during the meeting and analyzes (e.g., parses) the dialog related to each occurrence of a metadata trigger to identify various elements of the dialogue, such as names, dates, task descriptions, etc. Communication program 106 communicates the occurrences of identified metadata triggers and related text to meeting monitoring program 300. In various embodiments, communication analysis module 106 monitors a meeting and participants of the meeting via one or more devices and/or network 110. In one embodiment, communication analysis module 106 also analyzes test-based dialog of a meeting. In one example, communication analysis module 106 analyzes instant messages (IMs) and text chats among participants of a meeting to identify an occurrence of a metadata trigger. In another example, communication analysis module 106 analyzes text that is identified within a meeting, such as text input to a digital whiteboard (e.g., I/O device 130) or text highlighted during a presentation of a document.

In another embodiment, communication analysis module 106 includes voice recognition and image recognition programs to: further identify and further associate one or more participants of a meeting with a metadata trigger and/or an action associated with the metadata trigger. Participant identification can include: a name, a department, and organizational structures, a team, a level of authority, etc.

In other embodiments, communication analysis module 106 may be comprised of a suite of programs that includes: semantic, cognitive, analytical, contextual analysis, image processing, gesture recognition, database search capabilities, and the like. For example, communication analysis module 106 may utilize and/or access other software to determine additional information corresponding to the content (e.g., verbal, text, graphical, physical) presented during a meeting, such as identifying a file of a proposal that is included in the profile of an attendee in response to a discussion of the proposal. In one example, communication analysis module 106 follows a gesture by a presenter, within a meeting, to the indicated portion of a digital whiteboard (e.g., I/O device 130). Communication analysis module 106 further analyzes the indicated portion of the digital whiteboard to identify text and/or the file displayed on the digital whiteboard to identify an occurrence of a metadata trigger and/or a subject of an action associated with an occurrence of a metadata trigger. In some embodiments, communication analysis module 106 utilizes a plurality of programs and devices, accessible via network 110, to enable aspects of metadata configuration program 200 and/or meeting monitoring program 300.

Still referring to communication analysis module 106, in another embodiment, communication analysis module 106 may augment information communicated to meeting monitoring program 300 with additional information, such as citations, regulations, definitions, news articles, etc., obtained from a search/cognitive function. In a further embodiment, communication analysis module 106 may access some or all of a meeting that is buffered, recorded, and/or stored and utilize other software to determine additional information related to content (e.g., verbal, text, graphical, physical) of a meeting that occurs within a temporal proximity and/or contextual proximity of an occurrence metadata trigger and/or associated action. For example, communication analysis module may utilize: image recognition, cognitive analysis, contextual analysis, and analytics to further analyze: gestures, comments, graphics, sounds, video, etc., to determine related information (e.g., citations, regulations, calendar event, etc.) related to an action of an occurrence of a metadata trigger. Communication analysis module 106 may also include machine learning that analyzes actions and updates to metadata triggers during a meeting, by one or more users, to improve the analysis performed by metadata configuration program 200. In an alternative embodiment, communication analysis module 106 is a service available from a provider, such as an Internet-based teleconferencing service.

In one embodiment, computing system 102, device 120, device 121, and I/O device 130 communicate through network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between computing system 102, device 120, device 121, and I/O device 130, in accordance with embodiments of the present invention. In another embodiment, network 110 operates locally via wired, wireless, or optical connections and can be any combination of connections and protocols (e.g., near field communication (NFC), laser, infrared, etc.).

In one embodiment, UI 122 and UI 123 may be graphical user interfaces (GUIs) or web user interfaces (WUIs), and UI 122 and UI 123 can display text, documents, spreadsheets, graphs, user options, application interfaces, and instructions for operation. In some embodiments, UI 122 and UI 123 can interface with a teleconference program that presents information of a meeting, such as graphics, text, and sound to users of device 120 and device 121, respectively. In various embodiments, UI 122 and UI 123 display one or more icons representing applications that a user can execute via network 110, such as metadata configuration program 200. In addition, UI 122 and UI 123 can control sequences of actions that the user utilizes to respond and/or validate actions associated with meeting monitoring program 300. In some embodiments, a user of device 120 can interact with UI 122 via a singular device, such as a touch screen (e.g., display) that performs both input to a GUI/WUI, and as an output device (e.g., a display) presenting a plurality of icons associated with apps and/or images depicting one or more executing applications. In other embodiments, an application (e.g., a web browser) can generate UI 122 operating within the GUI environment of device 120.

UI 122 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, a peripheral, such as a cyberglove, may provide haptic feedback (e.g., vibrations) to a user, and may be included in device 120. An I/O device interfacing with UI 122 may be connected to computing system 102, which may operate utilizing wired (e.g., USB port) or wireless network communications (e.g., infrared, NFC, etc.). For example, an I/O device may be a peripheral, such as a keyboard, a mouse, a trackball, and a click wheel that provides input from a user. A user may utilize UI 122 to interact with metadata configuration program 200 and meeting monitoring program 300.

Metadata configuration program 200 is a program to enable one or more users of networked computing environment 100 to define metadata triggers and one or more actions associated with the metadata trigger. In one embodiment, metadata configuration program 200 is utilized by a host, a moderator, an attendee, or a participant of a meeting to define metadata triggers and one or more actions associated with the metadata trigger. In one scenario, metadata configuration program 200 defines metadata triggers for a meeting as a whole. In other scenario, metadata configuration program 200 defines metadata triggers that are utilized by individuals and/or groups (e.g., teams). In some scenarios, metadata configuration program 200 may define a set of metadata triggers specific to each meeting.

In another embodiment, metadata configuration program 200 associates one or more actions in response to the occurrence of a metadata trigger. In various embodiments, actions associated with an occurrence of a metadata trigger can have: single responses, tiered and/or logical actions based on additional information that occurs within contextual and/or temporal proximity to (e.g., following, preceding) the metadata trigger.

In some embodiments, metadata configuration program 200 provides a user an interface to retrieve previously stored metadata triggers and associated actions and delete or modify the previously stored metadata triggers and associated actions. In other embodiments, metadata configuration program 200 enables a user (e.g., moderator, attendee) of a meeting to create and update a personal profile for the user or a team. Personal profiles can include one or more metadata triggers and associated actions defined by a user.

Meeting monitoring program 300 is a program to monitor a meeting and to identify tasks within the meeting based on metadata triggers defined by various participants of the meeting, such as a moderator, a participant, and/or a team. Meeting monitoring program 300 monitors various elements of the meeting, such as speech, text, images, gestures, etc. Meeting monitoring program 300 utilizes aspects of communication analysis program 106 to analyze the various elements during the meeting and to identify occurrences one or more metadata triggers. In one embodiment, meeting monitoring program 300 monitors a plurality of users of an in-person (e.g., single location) meeting by utilizing one or more instances of I/O device 130. In another embodiment, meeting monitoring program 300 can monitor a meeting comprised of input from a plurality of locations, devices, and users.

In some embodiments, meeting monitoring program 300 utilizes other aspects of communication module 106 to parse and analyze information within one or more elements of the meeting that occur within a temporal proximity and/or contextual proximity of an occurrence of a metadata trigger. In other embodiments, meeting monitoring program 300 utilizes the parsed and analyzed information associated with the occurrence of a metadata trigger to generate one or more tasks based on the context of the metadata trigger. Meeting monitoring program 300 determines, based on meeting preference and/or response criterion associated with a metadata trigger, whether a task indicates an immediate action and/or is included in one or more queues associated with the meeting. In further embodiments, meeting monitoring program 300 can utilize more complex interactions among meeting participants and occurrences of metadata triggers with respect to determining a task, one or more assignments of the task, and/or responding to the task. In an example, meeting monitoring program 300 can identify a participant based or audio or visual information, use semantic and cognitive analysis to prioritize tasks identified during the meeting, and use social perception to analyze the sentiments of one or more participants with respect to tasks and/or task assignments.

In one embodiment, I/O device 130 is an electronic interface device (e.g., electronic equipment) that can directly connect to computing system 102, device 120, or device 121. In another embodiment, I/O device 130 is an electronic interface device that is connected to network 110. I/O device 130 may include, but is not limited to: a digital whiteboard, a digital projector, a headset, and/or a microphone. I/O device 130 may include components, as depicted and described in further detail with respect to FIG. 4, in accordance with embodiments of the present invention.

In some embodiments, networked computing environment 100 may include multiple instances of I/O device 130 and some instances of I/O device 130 are different than other instances.

Figure 2:
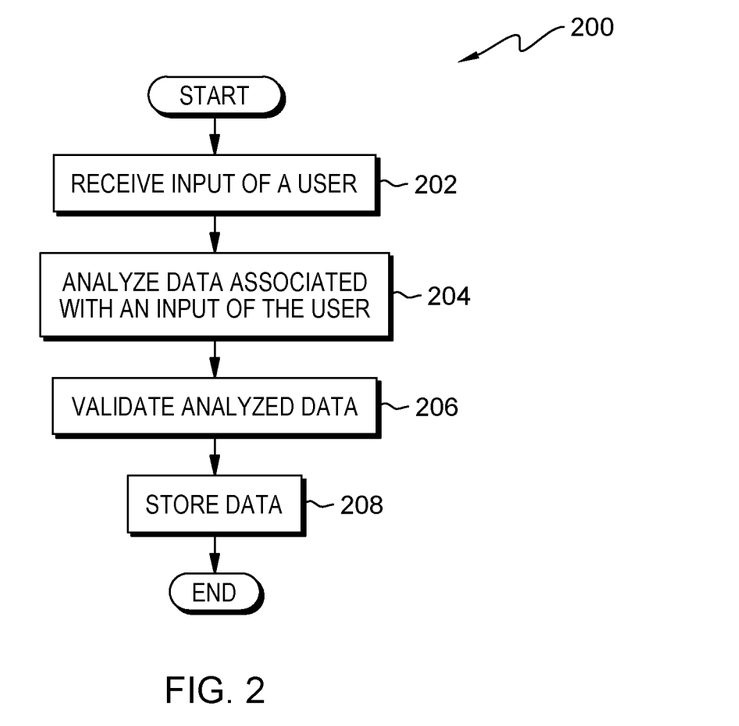
FIG. 2 depicts a flowchart of the operational steps of a metadata configuration program, in accordance with an embodiment of the present invention.
Figure 3:
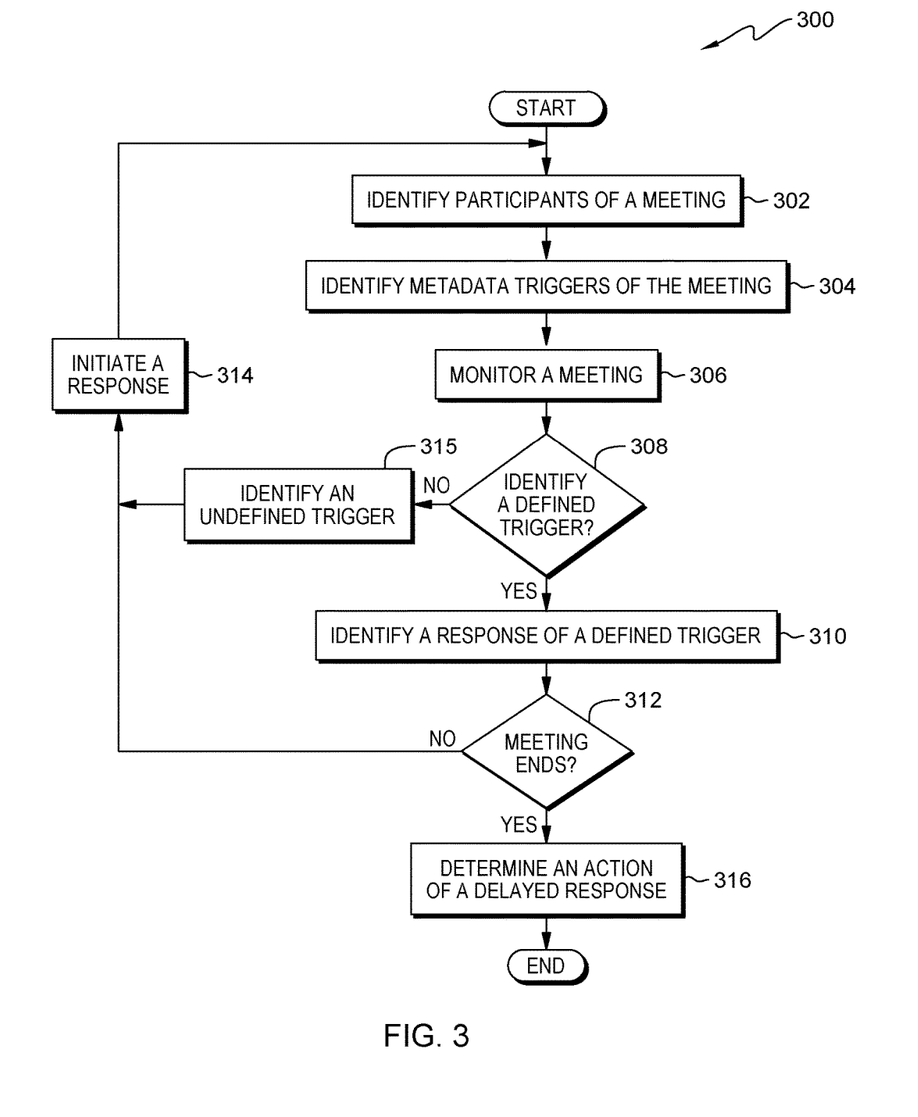
FIG. 3 depicts a flowchart of the operational steps of a meeting monitoring program, in accordance with an embodiment of the present invention.

FIG. 2 is a flowchart depicting operational steps for metadata configuration program 200, a program that receives information input from one or more users to identify metadata triggers and receives one or more rules that parse and/or define an action associated with an occurrence of a metadata trigger during a meeting, in accordance with embodiments of the present invention. In some embodiments, metadata configuration program 200 executes concurrently with meeting monitoring program 300 to define one or more other metadata triggers that are input by a mediator of a meeting and/or a participant of the meeting. In other embodiments, metadata configuration program 200 executes in response to meeting monitoring program 300 identifying an undefined metadata trigger that is input by a mediator of a meeting and/or a participant of the meeting.

In step 202, metadata configuration program 200 receives input of a user. In one embodiment, metadata configuration program 200 receives one or more metadata triggers and one or more rules that parse and/or identify one or more actions related to the occurrence of a metadata trigger identified during a meeting from a mediator (e.g., a user) of the meeting. In another embodiment, metadata configuration program 200 receives one or more metadata triggers and one or more rules that parse and/or identify one or more actions related to the occurrence of a metadata trigger identified during a meeting from a participant of the meeting.

In some embodiments, metadata configuration program 200 receives input from a mediator of a meeting, prior to the meeting, that is generalized to identify occurrences of metadata triggers and related actions that occur within communication methods, such as verbal, text, visual, etc., of a meeting that can be applicable to attendees of the meeting. In other embodiments, metadata configuration program 200 receives input from an attendee of the meeting, prior to the meeting, which identifies occurrences of metadata triggers and related actions that are specific to an attendee or a group of attendees of the meeting. In an alternative embodiment, metadata configuration program 200 receives input related to a user from another source, such as a user that is not an attendee of a meeting, prior to the meeting, and input from: a user profile, an enterprise database (e.g., names, e-mail addresses, positions, department numbers, phone numbers, etc.), and/or a project database. For example, a project database may include: previous assignment to individuals, timelines, milestones, files, presentations, resource allocations, costs and accounting information, etc.

In various embodiments, metadata configuration program 200 receives metadata triggers and one or more rules that parse and/or identify one or more actions related to the occurrence of a metadata trigger via a user interface (e.g., UI 122, UI 123). In addition, metadata configuration program 200 may receive input from a user that a metadata trigger includes one or more response criterion. In one example, metadata configuration program 200 receives input of a meeting attendee that utilizes device 121 to define metadata triggers and related actions that occur via a text chat function of the meeting as opposed to the audio portion of the meeting. In another example, metadata configuration program 200 utilizes communication analysis module 106 to identify a metadata trigger that is used to configure another metadata trigger and related actions, such as identifying that a participant utilizes a "raise hand" function of communication program 104 to identify that subsequent information may be important (e.g., trigger an action).

In a further embodiment, metadata configuration program 200 receives input from a user that is associated with a profile for a user. In one example, metadata configuration program 200 receives input of a user profile related to a user, such as a user speaking the name of the user, a text version of the name of the user, a picture of the user, a department of the user, a role of the user (e.g., engineer, programmer, planner, etc.), language preferences of a user, etc. In another example, metadata configuration program 200 receives other profile-related information of the user, such as actions/assignments to direct to the user, files, and/or links (e.g., mapped network drive locations) to files that are utilized during a meeting, and one or more assignments included from another meeting.

In step 204, metadata configuration program 200 analyzes data associated with an input of a user. In one embodiment, metadata configuration program 200 analyzes the input associated with a user to identify a metadata trigger and one or more actions associated with the metadata trigger. In some embodiments, metadata configuration program 200 analyzes the input associated with a user to determine whether a metadata trigger and/or actions includes logical and/or hierarchical elements. For example, metadata configuration program 200 may query a file and/or database (e.g., in storage 103, or in storage on device 121) to identify rules for parsing a metadata trigger and associated actions to determine whether two or more conditions trigger an action or whether different conditions (e.g., inputs) associated with a metadata trigger initiate (e.g., trigger) different actions. In another embodiment, metadata configuration program 200 analyzes a user input to determine a response flag (e.g., criterion) for a metadata trigger, such as initiate immediately, delay an in-meeting response, and initiate a response after a meeting.

In other embodiments, metadata configuration program 200 analyzes two or more sets of metadata triggers and associated actions of different users to identify conflicts among actions associated with a common metadata trigger. For example, metadata configuration program 200 may query multiple files and/or a database (e.g., in storage 103, or in storage on device 120) to access sets of metadata triggers for analysis. In various embodiments, metadata configuration program 200 analyzes a profile of a user to identify profile elements that are not included or are incomplete.

In step 206, metadata configuration program 200 validates the analyzed data. In one embodiment, metadata configuration program 200 presents, via UI 122 or UI 123, a listing of information that is associated with a user. Metadata configuration program 200 waits for a user (e.g., a moderator, a meeting attendee, etc.) to confirm and/or update information associated with a user. In some embodiments, metadata configuration program 200 validates analyzed data based on one or more rules identified in step 204. In an example, metadata configuration program 200 identifies (e.g., flags, highlights) a metadata trigger and/or associated actions that do not comply with one or more rules identified in step 204 to a user, via UI 122 or UI 123. In an example, metadata configuration program 200 identifies sets of metadata triggers including one or more common metadata triggers that include actions that conflict. Metadata configuration program 200 communicates (e.g., via e-mail, initiating and instance of a UI) with the users that control the set of metadata triggers that include the common, defined metadata trigger also includes actions that conflict. One or more users utilize an instance of metadata configuration program 200 to update one or more actions of at least one of the common metadata triggers to resolve the actions that conflict.

In another embodiment, metadata configuration program 200 queries a database (not shown) within storage 103 to retrieve (e.g., import) information of a user, such as previously assigned tasks, that the user may update via UI 122. In one example, prior to a meeting, a user utilizes metadata configuration program 200 to update status, assignments, dates, etc. associated with actions/tasks assigned during another meeting. In another example, metadata configuration program 200 identifies to a user one or more profile elements that need inclusion or completion.

In step 208, metadata configuration program 200 stores data. In one embodiment, metadata configuration program 200 stores data in a database in storage 103 or computing system 102. In another embodiment, metadata configuration program 200 stores data that is identified by a user as personal triggers and actions in another location. In one scenario, metadata configuration program 200 stores personal triggers and actions in another table of the database within storage 103. In another scenario, metadata configuration program 200 stores personal triggers and actions on a device of a user (e.g., device 121).

FIG. 3 is a flowchart depicting operational steps for meeting monitoring program 300, a program for monitoring a meeting to identify occurrences of metadata triggers, to identify one or more actions related to each occurrence of a metadata trigger and to respond to one or more actions related to each occurrence of the metadata trigger, in accordance with embodiments of the present invention. In one embodiment, meeting program 300 initiates in response to communication program 104 establishing a communication (e.g., a web conference, a meeting) among one or more devices within networked computing environment 100. In another embodiment, meeting program 300 initiates in response to a request from a device within networked computing environment 100 to monitor a meeting. In some embodiments, meeting monitoring program 300 receives (e.g., imports) various meeting preferences and meeting specific metadata triggers based on input from a participant of the meeting, such as the moderator. In other embodiments, meeting monitoring program 300 may utilize inputs from one or more instances of communication analysis module 106 and/or metadata configuration program 200. In various embodiments, if meeting monitoring program 300 identifies more than one conversation, discussion, and/or chat occurring at the same time, then meeting monitoring program 300 can spawn additional threads to track the other conversations, discussions, and/or chats.

In step 302, meeting monitoring program 300 identifies participants of a meeting. In one embodiment, meeting monitoring program 300 identifies participants of a meeting based on an electronic communication related to the meeting, such as the invitees of a calendar entry for the meeting. In another embodiment, meeting monitoring program 300 identifies participants of a meeting based on electronic links (e.g., user logins) to the meeting. In some embodiments, meeting monitoring program 300 identifies one or more participants of a meeting based on an introduction or an appearance within the meeting. In an example, meeting monitoring program 300 can utilize: a voice recognition program (e.g., who is speaking), a speech recognition program (e.g., what is said, spoken name), and/or an image recognition program to identify individual participants of a meeting. In some scenarios, meeting monitoring program 300 utilizes communication program 104 and/or communication analysis module 106 to identify participants of a meeting. In other scenarios, meeting monitoring program 300 utilizes one or more programs and/or functions accessible via network 110 to identify participants of a meeting.

In other embodiments, meeting monitoring program 300 stores the identities and related information (e.g., name, voice, etc.) of participants of the meeting in storage 103 for subsequent use when relating tasks and/or actions to a meeting participant. In various embodiments, meeting monitoring program 300 can determine differences between the identified attendees of the meeting and the participants invited to the meeting (e.g., calendar invitees) and include the determined information in actions related to the meeting. In a further embodiment, meeting monitoring program 300 can identify changes in attendance of a meeting, such as which attendees leave a meeting prior to the end of the meeting and when a new attendee joins a meeting that is in progress.

In step 304, meeting monitoring program 300 identifies metadata triggers of the meeting. In one embodiment, meeting monitoring program 300 identifies metadata triggers of a moderator for the meeting. In another embodiment, meeting monitoring program 300 identifies metadata triggers of one or more participants of the meeting. In various embodiments, meeting monitoring program 300 modifies the metadata triggers active during a meeting based on a change in attendance. In an example, meeting monitoring program 300 may include one or more additional metadata triggers in a meeting in response to identifying that a new participant attends the meeting after the meeting starts. In an alternative example, meeting monitoring program 300 may remove one or more metadata triggers of a meeting in response to identifying that a participant leaves the meeting after the meeting starts.

In some embodiments, meeting monitoring program 300 identifies and retrieves metadata triggers and one or more associated actions stored in a file and/or database on computing system 102, device 120, and/or device 121. In other embodiments, meeting monitoring program 300 may identify additional metadata triggers and associated actions input during the meeting. In a further embodiment, meeting monitoring program 300 communicates one or more locations (e.g., storage 103, device 121, etc.) of the stored metadata triggers and associated actions to communication analysis program 106.

In step 306, meeting monitoring program 300 monitors a meeting. In an embodiment, meeting monitoring program 300 identifies one or more criteria for monitoring a meeting, such as time constraints, levels of analysis utilized by communication analysis program 106, a quorum value, etc. Such criteria may be predefined by a moderator of a meeting and stored in a profile for the meeting or a profile of the moderator. In one embodiment, meeting monitoring program 300 initiates one or more instance of communication analysis module 106 to monitor the meeting. Meeting monitoring program 300 communicates identified metadata triggers to communication analysis module 106. As a meeting progresses, meeting monitoring program 300 receives information from communication analysis module 106 that identifies occurrences metadata triggers that are defined (e.g., include one or more actions) to meeting monitoring program 300 and that flags occurrences of metadata triggers that are not defined (e.g., do not include one or more actions). In another embodiment, meeting monitoring program 300 utilizes communication program 104 to buffer and/or store a meeting on computing system 102 or a storage location (not shown) accessible via network 110.

In various embodiments, meeting monitoring program 300 receives information from communication analysis program 106 that is associated with an action or a delayed task in an in-meeting queue. Communication analysis program 106 identifies an occurrence of information, during another portion of the meeting, which satisfies one or more: tiered, logical, and/or hierarchical elements (e.g., criteria) related to a metadata trigger or second metadata trigger associated with the action or delayed task of the in-meeting queue.

In some embodiments, meeting monitoring program 300 indicates, based on one or more rules of a meeting and/or a higher-level metadata trigger (e.g., moderator command), that communication analysis module 106 parses and analyzes information (e.g., words, text, gestures, etc.) of the meeting based on one or more additional methods to improve the identification of metadata triggers and associated actions. In an example, meeting monitoring program 300 may indicate that communication analysis module 106 includes a dictionary/thesaurus function to identify words that are similar (e.g., synonyms, homonyms, common misspellings, etc.) to the wording of a metadata trigger and associated actions. In another example, communication analysis module 106 may utilize image recognition and a verbal description to identify a resource discussed during a meeting, such as a computer aided design (CAD) workstation.

In a further embodiment of step 306, meeting monitoring program 300 may utilize: cognitive analysis, contextual analysis, analytics, image processing, voice recognition software, etc., to determine information that relates to a metadata trigger and associated actions. In an example, meeting monitoring program 300 indicates that communication analysis module 106 includes gesture and image recognition and contextual analysis during a meeting. While monitoring a meeting, communication analysis module 106 detects the phrase "who will volunteer for the assignment" and detects that a participant gestures (raises a hand) but does not indicate a name. In this example, communication analysis module 106 utilizes a thesaurus function to identify a metadata trigger associated with "volunteer," parse backward in the buffered meeting (e.g., dialog) to identify the assignment (i.e., task), and utilize image recognition and user profiles to identify the meeting participant that raised a hand to accept the assignment.

In decision step 308, meeting monitoring program 300 identifies a defined trigger. In one embodiment, meeting monitoring program 300 receives information from communication analysis module 106 that identifies an occurrence of a metadata trigger during a meeting. In addition, communication analysis module 106 identifies that the occurrence of the metadata trigger corresponds to a defined metadata trigger.

In another embodiment, meeting monitoring program 300 receives an indication that an instance of metadata configuration program 200 is to create a metadata trigger; therefore, the identified metadata trigger is not defined. In an example, meeting monitoring program 300 detects an occurrence of a metadata trigger that dictates the definition of a new metadata trigger and associated actions. Meeting monitoring program 300 initiates an instance of metadata configuration program 200 so that a user can define the metadata trigger and associated actions. In a further embodiment, if meeting monitoring program 300 determines that an occurrence of an identified metadata trigger includes conflicting actions or causes a fault, then meeting monitoring program 300 does not identify the metadata trigger as "defined." In an alternative embodiment, if communication analysis module 106 does not identify a metadata trigger within a monitored meeting, then meeting monitoring program 300 loops via the "No" branch of decision step 308 to identify changes associated with participants of the meeting and changes to metadata triggers for the meeting.

Responsive to identifying a defined trigger (Yes branch, decision step 308), meeting monitoring program 300 identifies a response to a defined trigger (step 310).

In step 310, meeting monitoring program 300 identifies a response of a defined trigger. In various embodiments, meeting monitoring program 300 determines whether an occurrence of a metadata trigger initiates an immediate response (e.g., action, task), creates a queue of delayed responses (e.g., waiting for a response on an attendee, waiting for another trigger, etc.) within the meeting, and/or generates a queue of responses that occur after the meeting. Embodiments of meeting monitoring program 300 can generate one or more: immediate response tasks, a queue of in-meeting delayed responses tasks (e.g., delayed in-meeting actions), queues of responses that occur after the meeting, and any combination thereof.

In one embodiment, meeting monitoring program 300 responds to the identification of an occurrence of a defined metadata trigger by accessing a database (e.g., within storage 103, in storage on device 121, etc.) that includes the one or more actions associated with a defined metadata trigger. Meeting monitoring program 300 utilizes the one or more actions to generate a response to an identified occurrence of a defined metadata trigger. In one example, meeting monitoring program 300 utilizes the one or more actions of a metadata trigger "as-is," without further analysis or interpretation to generate a response, such as "start a brainstorming session." In this example, meeting monitoring program 300, identifies that the metadata trigger is "brainstorming" that is identified as an immediate action and includes activating a recording function and a timer.

In another example, meeting monitoring program 300 initiates one or more instances of a UI to obtain information from one or more participants of the meeting to generate a response to the actions associated with an occurrence of an identified metadata trigger, such as "status of action item one." In this example, meeting monitoring program 300 "knows" which participants of the meeting are associated with "action item one," including delegated participants, and meeting monitoring program 300 utilizes communication program 104 to initiate instances of a UI for the meeting for the participants associated with "action item one."

In a different example, meeting monitoring program 300 responds to a preset metadata trigger, such as "status report" that retrieves (e.g., imports) a list of tasks generated during a previous meeting that are stored, for example on computing system 102. In addition, meeting monitoring program 300 may automatically include the status report task in the in-meeting queue. Each task may be associated with a metadata trigger and the task associated metadata trigger can occur during the current meeting or be communicated to another meeting.

Still referring to step 310 in another embodiment, meeting monitoring program 300 utilizes information provided by communication analysis module 106 to generate a response based on an occurrence of an identified metadata trigger. In one scenario, meeting monitoring program 300 receives information from communication analysis module 106 that identifies the context of information (e.g., a portion of dialog of a meeting) and actions associated with an occurrence of a defined metadata trigger within the meeting. In an example, meeting monitoring program 300 receives information from communication analysis module 106 related to a metadata trigger used to identify a task from the meeting dialog that identifies criteria related to a task, such as one or more timeframes, a description of the task, and skills associated with a task. In this example, meeting monitoring program 300 determines this occurrence of the metadata trigger includes: an immediate response, such as displaying the task; and in-meeting delayed task, such as setting a priority of the task; and a post-meeting task, such as assigning the task to one or more individuals (e.g., a meeting participant, a team member that is not present, etc.) and scheduling phased for the task.

In various scenarios, meeting monitoring program 300 may determine that a response to an identified trigger is based on one or more conditions, such as tiered, logical, and/or hierarchical elements. Some conditions may be associated with one or more metadata triggers of tasks/action of an in-meeting queue. Other conditions may be identified within the current information received from communication analysis module 106. In an example, meeting monitoring program 300 determines from a task list (e.g., status update, "follow-up" items) of a previous meeting and information received from communication module 106 monitoring the meeting, that a task identified by a metadata trigger can be added to a task list. However, meeting monitoring program 300 determines the priority of the task associated with an occurrence of a metadata trigger cannot be set higher than a prerequisite task within the task list until the prerequisite task meets a dictated milestone.

In some embodiments, meeting monitoring program 300 utilizes information provided by communication analysis module 106 that affects one or more responses (e.g., tasks) of a queue. In one scenario, meeting monitoring program 300 responds to an occurrence of a metadata trigger related to prioritization of tasks. Meeting monitoring program 300 spawns a discussion thread and utilizes communication analysis module 106 to analyze and extract information from the discussion that prioritizes tasks as opposed to utilizing one or more UIs to prioritize tasks manually. In an example, meeting monitoring program 300 utilizes communication analysis module 106 to interpret and contextualize dialog that includes terms, such as "critical," "dependent," "medium priority," etc. In another example, meeting monitoring program 300 responds to a task related to dialog "requiring urgent repair" by identifying the task as high priority and initiating an immediate action, such as opening a work order. In another scenario, meeting monitoring program 300 responds to an instance of communication analysis module 106 that monitors I/O device 130 to process the information drawn (e.g., input) on I/O device 130, such as diagrams and flowcharts that indicate the relationships and orders of tasks. Further analysis of information from I/O device 130 may include, for example, dates and the number of users for each task.

In a further embodiment, meeting monitoring program 300 indicates to communication module 106 that a higher level of analysis is utilized for an instance of a meeting. For example, communication module 106 may include additional cognitive functions that support social perception analysis and sentiment analysis. In this example, meeting monitoring program 300 receives information from communication module 106 that can prioritize and/or flag tasks in a list or queue based on interpretations of words, gestures, facial expressions, etc. of one or more participants of a meeting. Examples of flagged sentiment include: concurrence of an attendee for a due date, lack of confidence that sufficient data was presented for a decision, and concern with a priority assigned to a task.

In decision step 312, meeting monitoring program 300 determines whether a meeting ends. In one embodiment, meeting monitoring program 300 determines that a meeting ends based on an indication from a moderator of the meeting. In another embodiment, meeting monitoring program 300 determines that a meeting ends based on identifying a metadata trigger that indicates such. In some embodiments, meeting monitoring program 300 determines that a meeting ends if sufficient participants leave the meeting so that the meeting does not qualify as having a quorum. In other embodiments, meeting monitoring program 300 determines that a meeting ends based on a vote from the participants of the meeting. Responsive to determining that a meeting does not end (No branch, decision step 312), meeting monitoring program 300 initiates a response (step 314).

In step 314, meeting monitoring program 300 initiates a response. In one embodiment, meeting monitoring program 300 initiates an identified response that is identified by an initiate immediately flag. In another embodiment, meeting monitoring program 300 loops to step 302 to continue to obtain additional information, to monitor the meeting, and initiates the response flagged for delay in response meeting monitoring program 300 determining that the conditions associated with the occurrence of a metadata trigger are satisfied. In a further embodiment, if meeting monitoring program 300 does not obtain sufficient information to respond to an occurrence of an identified metadata trigger, then meeting monitoring program 300 can utilize a cognitive and/or machine learning aspect of communication analysis module 106 to scan information, tasks, and discussions of one or more prior meeting to determine one or more possible actions or solutions to the occurrence of the metadata trigger. Meeting monitoring program 300 communicates the possible actions and/or solutions to one or more participants of the meeting, such as the moderator.

Referring to decision step 308 in an embodiment, responsive to determining that a defined trigger is not identified (No branch, decision step 308), meeting monitoring program 300 identifies an undefined trigger (step 315). In an alternative embodiment, if communication analysis module 106 indicates to meeting monitoring program 300 that a metadata trigger is not identified within a monitored meeting (No branch, decision step 308), then meeting monitoring program 300 may loop on a periodic basis to identify changes: associated with participants of the meeting and to metadata triggers for the meeting. Subsequently, meeting monitoring program 300 continues to monitor the meeting. While looping, meeting monitoring program 300 may skip step 314, and step 315.

In step 315, meeting monitoring program 300 identifies an undefined trigger. In one embodiment, meeting monitoring program 300 initiates an instance of metadata configuration program 200 to obtain additional data and/or actions to define a metadata trigger that is identified; however, is incomplete based on missing one or more actions. In another embodiment, meeting monitoring program 300 determines that a metadata trigger or a specific occurrence of a metadata trigger is undefined based on a conflict or a fault caused by the metadata trigger. In one scenario, meeting monitoring program 300 communicates with a moderator of a meeting to utilize metadata configuration program 200 to update/fix the metadata trigger. In another scenario, meeting monitoring program 300 identifies the participants of the meeting that control the conflicting instances of a metadata trigger. Meeting monitoring program 300 communicates with the identified participants that control the conflicting instances of a metadata trigger to update/fix the affected metadata trigger.

In some embodiments, a participant of a meeting (e.g., a moderator) uses a UI to indicate to meeting monitoring program 300 to ignore the current occurrence of the undefined metadata trigger. In other embodiments, a participant of a meeting (e.g., a moderator) uses a UI to indicate to meeting monitoring program 300 to delete undefined metadata trigger with respect to the meeting.

Referring to step 314, in an alternative embodiment, meeting monitoring program 300 initiates a response to an identified undefined metadata trigger that is updated by a user that utilized an instance of metadata configuration program 200. In some scenarios, meeting monitoring program 300 initiates the one or more actions included in the updates metadata trigger. In other scenarios, meeting monitoring program 300 determines that the updated metadata trigger dictates one or more additional conditions (e.g., triggers) to activate, and meeting monitoring program 300 loops to continue monitor the meeting, via communication analysis module 106.

Referring to decision step 312, responsive to determining that a meeting ends (Yes branch decision, step 312), meeting monitoring program 300 determines an action of a delayed response.

In step 316, meeting monitoring program 300 determines an action of a delayed response. In one embodiment, meeting monitoring program 300 identifies one or more responses that were delayed until a meeting ends (e.g., post-meeting actions) and initiates one or more delayed (e.g., queued) responses, such as e-mailing a list of tasks and assignments to participants, communicating a transcript of the meeting, files, and/or links to files presented during the meeting to one or more participants. In another embodiment, meeting monitoring program 300 updates one or more databases and/or calendar function with responses and/or results of the meeting, such as status updates, new tasks, assignments of individuals, etc. In some embodiments, meeting monitoring program 300 determines that a meeting ends; however, some or all participants remain available. Meeting monitoring program 300 may disable metadata triggers from obtaining additional tasks, but meeting monitoring program 300 may utilize one or more aspects of communication module 106 and/or other programs, such as a project planning application to analyze input from the remaining meeting participants and actions (e.g., queue items) that occurred during the meeting. In one example, meeting monitoring program 300 may determine whether: duplicate actions/tasks are in a queue, one or more participants accepted too many assignments, identify unassigned tasks, etc.

In an alternative embodiment, meeting monitoring program 300 receives input from a participant, such as a moderator, dictating the actions/responses that are initiated and dictating that other actions/responses are not initiated. Meeting monitoring program 300 may flag (e.g., store) the other actions/responses that are not initiated within a database on computing system 102 as tasks or "follow-up items" that are utilized (e.g., imported) during another meeting.

Figure 4:
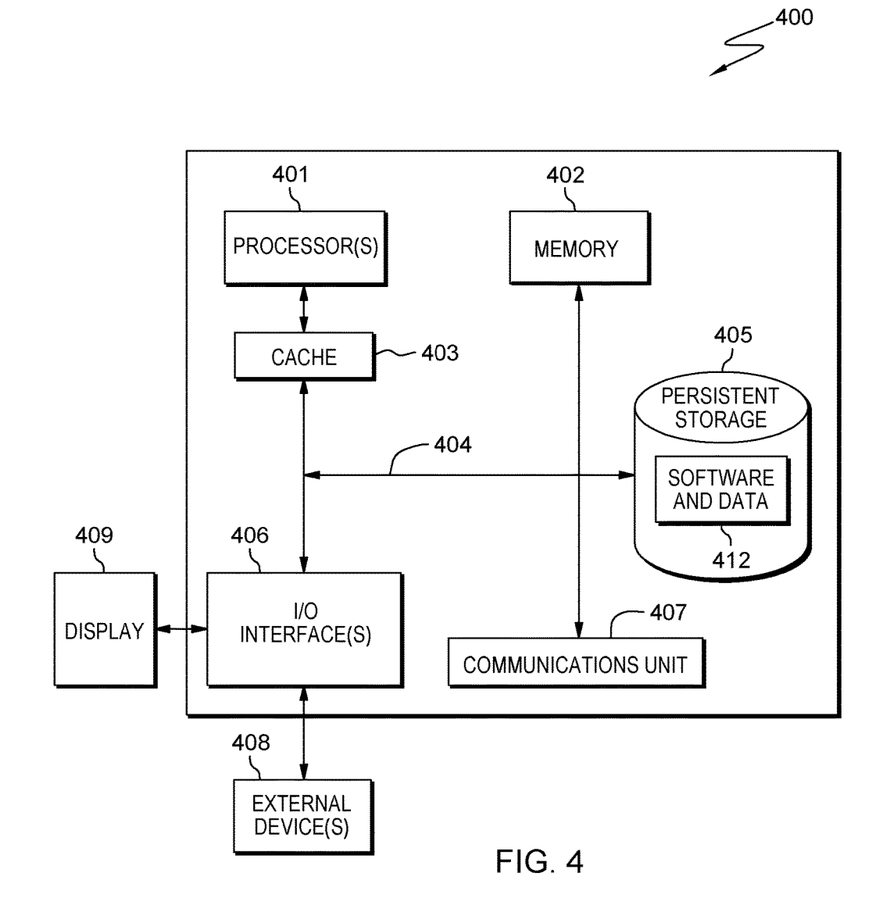
FIG. 4 is a block diagram of components of a computer, in accordance with an embodiment of the present invention.

FIG. 4 depicts computer system 400, which is representative of computing system 102, device 120, and device 121. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 102, software and data 412 includes communication program 104, communication analysis module 106, metadata configuration program 200, meeting monitoring program 300, and various programs (not shown). With respect to device 120, and device 121 software and data 412 includes UI 122 and 123 respectively and various programs and data (not show).

Communications unit 407, in these examples, provides for communications with other data processing systems or devices, including resources of computing system 102, device 120, and device 121. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. In some embodiments, I/O device 130 may communicate with computing system 102, device 120, or device 121 via communication unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device, such as I/O device 130. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying and initiating actions of a meeting, the method comprising:
    monitoring, by one or more computer processors, a meeting, wherein monitoring the meeting includes receiving input from at least a first computing device;
    identifying, by one or more computer processors, a plurality of metadata triggers associated with the received input of meeting;
    identifying, by one or more computer processors, an occurrence of a first metadata trigger of the plurality of metadata triggers associated with the received input of the meeting;
    analyzing, by one or more computer processors, a first portion of the received input of the meeting that includes an occurrence of the first metadata trigger, wherein analyzing the first portion of the received input includes identifying a first action;
    determining, by one or more computer processors, a response criterion of the first metadata trigger;
    responsive to determining that the first action includes a response criterion of delayed post-meeting action, including, by one or more processors, the first action in a queue of post-meeting actions that initiate in response to determining that the meeting ends; and
    responsive to determining that the first metadata trigger includes a response criterion indicating immediate action, initiating, by one or more computer processors, the first action.

2. The method of claim 1:
    wherein the received input of the meeting includes at least an audio component; and
    wherein the audio component is analyzed by utilizing at least one of: a voice recognition program, a speech recognition program, and a natural language processing program.

3. The method of claim 1:
    wherein a metadata trigger is associated with one or more rules utilized to parse a portion of the received input of the meeting that occurs in proximity to an occurrence of the metadata trigger; and
    wherein the metadata trigger includes a response criterion selected from a set of: immediate action, delayed in-meeting action, and delayed post-meeting action.

4. The method of claim 1, further comprising:
    determining, by one or more computer processors, that the first action corresponds to a first task and that the first metadata trigger dictates that a resource is assigned to the first task;
    identifying, by one or more computer processors, the resource based on analyzing a second portion of the received input associated with the occurrence of the first metadata trigger;
    assigning, by one or more computer processors, the resource to the first task;
    determining, by one or more computer processors, that the resource is a first participant of a plurality of participants included in the meeting; and
    responsive to determining that the first participant is assigned the first task, transmitting, by one or more computer processors, a message to at least the first participant that indicates the first task is assigned to the first participant.

5. The method of claim 1, further comprising:
    responsive to determining that the first action includes a response criterion of delayed in-meeting action, including, by one or more computer processors, the first action in an in-meeting queue of actions associated with the meeting;
    wherein an action of the in-meeting queue of actions initiates based on identifying an occurrence of information during a second portion of the meeting; and
    wherein the information satisfies a condition of a metadata trigger associated with the first action in the in-meeting queue.

6. The method of claim 1, further comprising:
    determining, by one or more computer processors, that the meeting ends; and
    responsive to determining that the meeting ends, initiating, by one or more computer processors one or more actions included in the queue of post-meeting actions associated with the meeting.

7. A computer program product for identifying and initiating actions of a meeting, the computer program product comprising:
    one or more computer readable storage media and program instructions stored on the one or more computer readable storage media, the program instructions readable/executable by one or more computer processors:
        program instructions to monitor a meeting, wherein monitoring the meeting includes receiving input from at least a first computing device;
        program instructions to identify a plurality of metadata triggers associated with the received input of meeting;
        program instructions to identify an occurrence of a first metadata trigger of the plurality of metadata triggers associated with the received input of the meeting;
        program instructions to analyze a first portion of the received input of the meeting that includes an occurrence of the first metadata trigger, wherein analyzing the first portion of the received input includes identifying a first action;
        program instructions to determine a response criterion of the first metadata trigger;
        program instructions to respond to a determination that the first action includes a response criterion of delayed post-meeting action by including the first action in a queue of post-meeting actions that initiate in response to a determination that the meeting ends; and
        program instructions to respond to a determination that the first metadata trigger includes a response criterion indicating immediate action by initiating the first action.

8. The computer program product of claim 7:
wherein the received input of the meeting includes at least an audio component; and
wherein the audio component is analyzed by utilizing at least one of: a voice recognition program, a speech recognition program, and a natural language processing program.

9. The computer program product of claim 7:
wherein a metadata trigger is associated with one or more rules utilized to parse a portion of the received input of the meeting that occurs in proximity to an occurrence of the metadata trigger; and
wherein the metadata trigger includes a response criterion selected from a set of: immediate action, delayed in-meeting action, and delayed post-meeting action.

10. The computer program product of claim 7, further comprising:
program instructions to determine that the first action corresponds to a first task and that the first metadata trigger dictates that a resource is assigned to the first task;
program instructions to identify the resource based on analyzing a second portion of the received input associated with the occurrence of the first metadata trigger;
program instructions to assign the resource to the first task;
program instructions to determine that the resource is a first participant of a plurality of participants included in the meeting; and
program instructions to respond to a determination that the first participant is assigned the first task by transmitting a message to at least the first participant that indicates the first task is assigned to the first participant.

11. The computer program product of claim 7, further comprising:
program instruction to respond to a determination that the first action includes a response criterion of delayed in-meeting action by including the first action in an in-meeting queue of actions associated with the meeting;
wherein an action of the in-meeting queue of actions initiates based on identifying an occurrence of information during a second portion of the meeting; and
wherein the information satisfies a condition of a metadata trigger associated with the first action in the in-meeting queue.

12. The computer program product of claim 7, further comprising:
program instructions to determine that the meeting ends; and
program instructions to respond to a determination that the meeting ends by initiating one or more actions included in the queue of post-meeting actions associated with the meeting.

13. A computer system for identifying and initiating actions of a meeting, the computer system comprising:
one or more computer processors;
one or more computer readable storage media;
program instructions stored on the computer readable storage media for execution by at least one of the one or more computer processors, the program instructions comprising:
program instructions to monitor a meeting, wherein monitoring the meeting includes receiving input from at least a first computing device;
program instructions to identify a plurality of metadata triggers associated with the received input of meeting;
program instructions to identify an occurrence of a first metadata trigger of the plurality of metadata triggers associated with the received input of the meeting;
program instructions to analyze a first portion of the received input of the meeting that includes an occurrence of the first metadata trigger, wherein analyzing the first portion of the received input includes identifying a first action;
program instructions to determine a response criterion of the first metadata trigger;
program instructions to respond to a determination that the first action includes a response criterion of delayed post-meeting action by including the first action in a queue of post-meeting actions that initiate in response to a determination that the meeting ends; and
program instructions to respond to a determination that the first metadata trigger includes a response criterion indicating immediate action by initiating the first action.

14. The computer system of claim 13:
wherein the received input of the meeting includes at least an audio component; and
wherein the audio component is analyzed by utilizing at least one of: a voice recognition program, a speech recognition program, and a natural language processing program.

15. The computer system of claim 13:
wherein a metadata trigger is associated with one or more rules utilized to parse a portion of the received input of the meeting that occurs in proximity to an occurrence of the metadata trigger, and
wherein the metadata trigger includes a response criterion selected from a set of: immediate action, delayed in-meeting action, and delayed post-meeting action.

16. The computer system of claim 13, further comprising:
program instructions to determine that the first action corresponds to a first task and that the first metadata trigger dictates that a resource is assigned to the first task;
program instructions to identify the resource based on analyzing a second portion of the received input associated with the occurrence of the first metadata trigger;
program instructions to assign the resource to the first task;
program instructions to determine that the resource is a first participant of a plurality of participants included in the meeting; and
program instructions to respond to a determination that the first participant is assigned the first task by transmitting a message to at least the first participant that indicates the first task is assigned to the first participant.

17. The computer system of claim 13, further comprising:
program instruction to respond to a determination that the first action includes a response criterion of delayed in-meeting action by including the first action in an in-meeting queue of actions associated with the meeting;
wherein an action of the in-meeting queue of actions initiates based on identifying an occurrence of information during a second portion of the meeting; and wherein the information satisfies a condition of a metadata trigger associated with the first action in the in-meeting queue.

\* \* \* \* \*